UNITED STATES PATENT OFFICE.

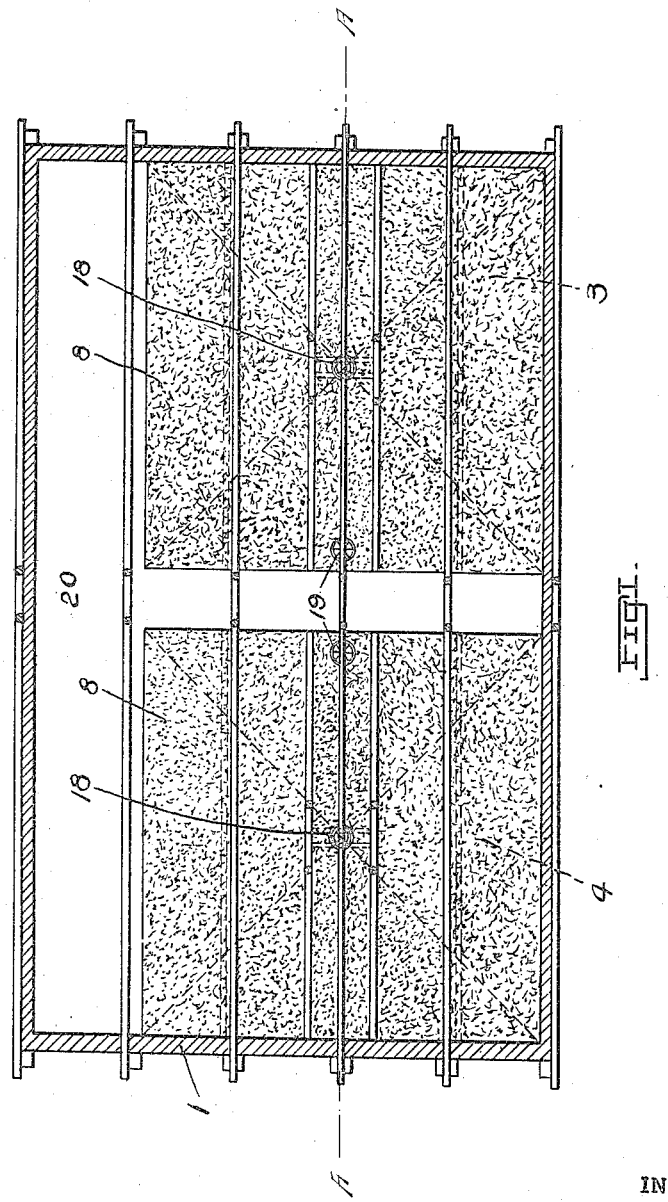

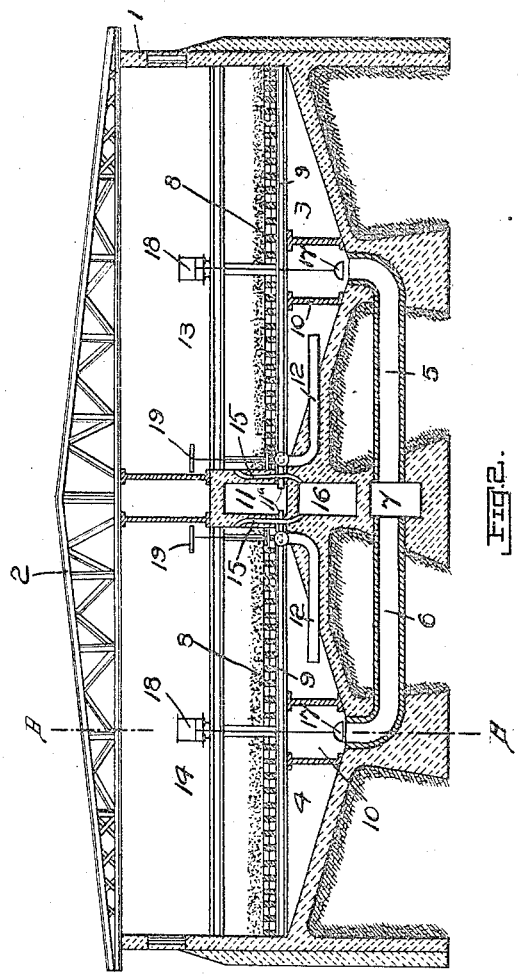

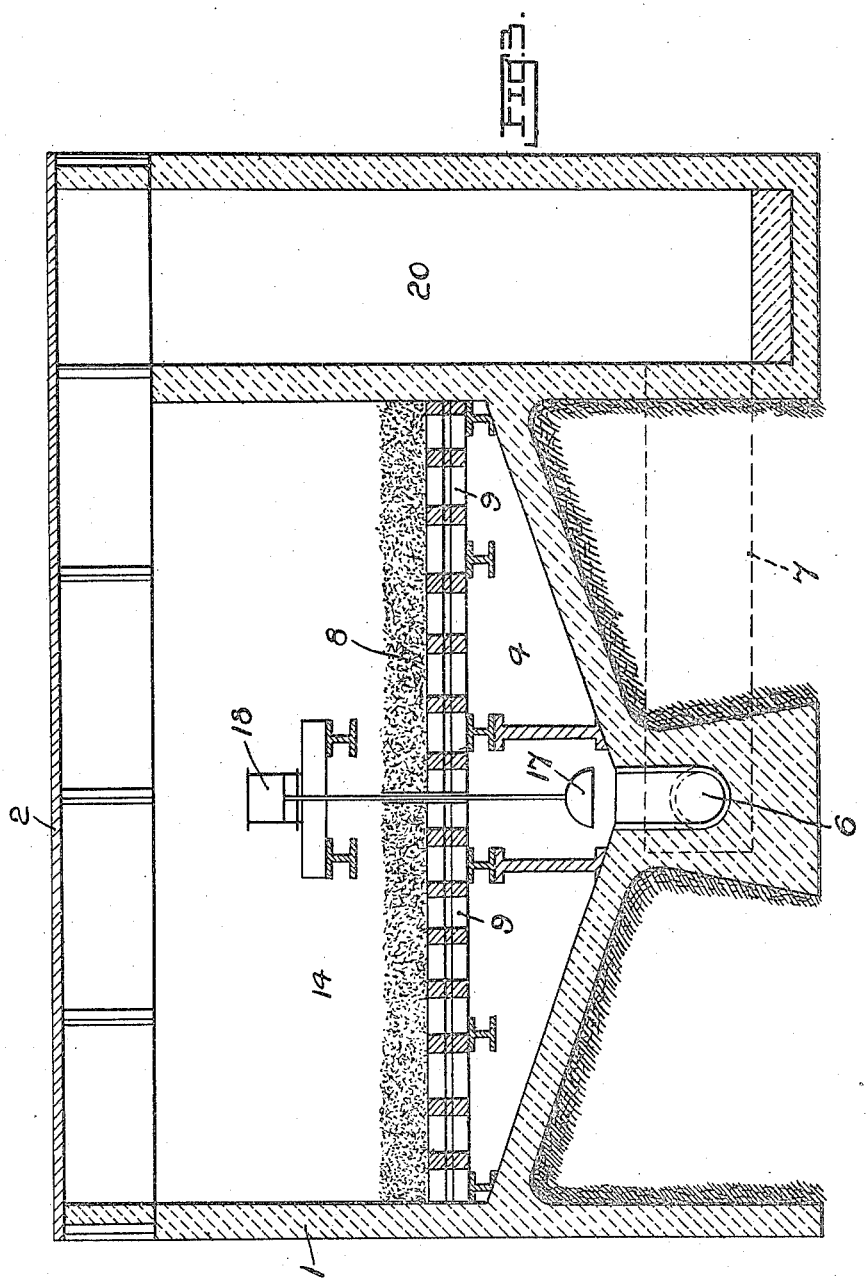

WILBROD DORVAL, OF MONTREAL, QUEBEC, CANADA.

FILTER.

1,247,241.   Specification of Letters Patent.   Patented Nov. 20, 1917.

Application filed April 28, 1917. Serial No. 165,153.

*To all whom it may concern:*

Be it known that I, WILBROD DORVAL, a subject of the King of Great Britain, residing at 126ᴬ Church street, in the city of Montreal, in the Province of Quebec, in the Dominion of Canada, have invented certain new and useful Improvements in a Filter; and I do hereby declare that the following is a full, clear, and exact description of the same.

The invention relates to improvements in a "gravity filter"; and the object of the invention is to provide a new and improved means for filtering water, preferably applicable on a large scale and to such purposes as the purification of the water supply of cities. To this end, the invention consists of a new and improved construction, by means of which the purification of the water and the cleansing of the filter and the filtering material are effected by a simple, inexpensive and efficient method.

Applicant is aware of the existence of gravity filters, but it is thought that to provide special means to supply the water and distribute same, and then to devise new means of cleansing the different reservoirs and filtering material, is new.

The invention consists of a filtering apparatus having therein construction and arrangements all substantial, as will hereinafter be fully described and set forth in the claims.

In the drawings, Figure 1 is a plan view, the roof having been removed.

Fig. 2 is a cross section view on line A—A of Fig. 1.

Fig. 3 is a cross section on line B—B of Fig. 2.

Like numerals of reference indicate corresponding parts in each figure.

In the drawings, 1 represents a concrete construction preferably provided with a roof 2, said construction 1 being divided into two reservoirs 3 and 4 suitably supported on good foundations. The reservoirs 3 and 4 are preferably made deeper at their centers in order that the impurities of the water will have a tendency to drop into the deepest part of the reservoir. At this point in each reservoir 3 and 4, outlet pipes 5 and 6 are provided, which are connected at their other ends to a canal or collector 7.

8 are filtering beds suitably supported on the transverse bars 9 and pillars 10, said filtering beds being preferably made of gravel and sand and placed below the water level which may come from any suitable source into the reservoir or canal 11, and from there distribute through the water pipes 11ᵃ and 12 into the reservoirs 3 and 4. The water level, being above the level of the filtering beds, will cause the water, when it enters the reservoirs 3 and 4, to force through the filtering beds 8 into the larger filtered reservoirs 13 and 14. The filtered water is then conducted from the reservoirs 13 and 14 through the conduits 15 into the filtered water collector 16, and from there is suitably distributed.

17 are valves mechanically operated by the cylinders 18. It is preferable to actuate the valves 17 by hydraulic power or by steam, as they are of very large dimension and could not be managed by hand. They are adapted to close the conduits 5 and 6 which direct the impurities into the collecting chamber or canal 7.

To filter the water as it comes into the canal, it is necessary to open the valves 19 in order to let in the water to be filtered into the reservoirs 3 and 4; but it will readily be seen that the valves 17 must be closed before doing this. The filtration is being done, as above explained, by gravity, and it is thought that many million gallons of water can be filtered in twenty-four hours in an ordinary plant of the type described.

The water, after having filtered through the filtering beds 8, enters the water conduits 15 and is collected in the filtered water canal 16 from which it is distributed. After the water has filtered through for a certain length of time, a very large amount of impurities of all kinds gathers between the gravel and sand outside of a certain portion which is heavy enough to stay in the bottom of the reservoirs 3 and 4. The valves 17 are then opened through the agency of the hydraulic means or the steam cylinders 18, and the water contained in the reservoir 13 and 14 and 3 and 4 will be conducted through the pipes 5 and 6 into the collecting canal 7.

The canal 7 can be connected to a reservoir 20 where the sediment or impurities may be collected and removed in any suitable way.

What I claim is:—

1. A filter comprising a plurality of V-shaped reservoirs, a central sediment collecting canal midway between said reservoirs, and pipes connected at one end to the bottom of said reservoirs leading to said collecting canal, and vertically movable valves adapted to close said sediment conducting pipes; a water supply canal above said sediment collecting canal, disposed between said V-shaped reservoirs, provided with pipes leading into said reservoirs; and valves on said pipes, adapted to cut off said water supply; filtering beds suitably secured above and covering the entire surface of said reservoirs; a central filtered water collecting canal between said supply canal and said sediment collecting canal, in alinement therewith; and pipes connected above said filtering beds, leading to said filtered water collecting canal, substantially as described.

2. A filter comprising a plurality of V-shaped reservoirs supported on each side; a vertical partition between said reservoirs and provided with three horizontal conduits, one above the other and in alinement; filtering beds above said V-shaped reservoirs and suitably supported thereon; outlet pipes suitably secured to the lowest portion of said V-shaped reservoirs at one end, and secured at the other end to the bottom horizontal conduit; water supply pipes connected at one end to the uppermost horizontal conduit, leading into said V-shaped reservoirs; and filtered water conduits provided within said vertical partition leading from above said water filtering beds to the central filtered water collecting horizontal conduit; and valves adapted to close said outlet pipes and water supply pipes, substantially as described.

Signed at Verdun this twenty-third day of March, 1916.

WILBROD DORVAL.

Witnesses:
H. DORVAL,
EBJEARD EMOND.